US012671004B2

(12) United States Patent
Lange et al.

(10) Patent No.: US 12,671,004 B2
(45) Date of Patent: Jun. 30, 2026

(54) MICROREACTOR WITH CONTROL NEUTRON ABSORBER ASSEMBLY INCLUDING A CONTROL NEUTRON ABSORBER ROD

(71) Applicants: Battelle Energy Alliance, LLC, Idaho Falls, ID (US); WALSH Engineering Services, PC, Idaho Falls, ID (US)

(72) Inventors: Travis L. Lange, Idaho Falls, ID (US); Yasir Arafat, Idaho Falls, ID (US); Benjamin A. Baker, Ammon, ID (US); Stanley Blaine Grover, Idaho Falls, ID (US); Jeffrey Donald Jones, Idaho Falls, ID (US); Lucas Avery Andrew, Idaho Falls, ID (US); Mathew Ryan Floyd, Pocatello, ID (US); Kyle Bruce Francis, Idaho Falls, ID (US); Tarrin Scott Funderburg, Idaho Falls, ID (US)

(73) Assignees: Battelle Energy Alliance, LLC, Idaho Falls, ID (US); WALSH Engineering Services, PC, Idaho Falls, ID (US)

( * ) Notice: Subject to any disclaimer, the term of this patent is extended or adjusted under 35 U.S.C. 154(b) by 416 days.

(21) Appl. No.: 18/179,251

(22) Filed: Mar. 6, 2023

(65) Prior Publication Data

US 2023/0282375 A1 Sep. 7, 2023

Related U.S. Application Data

(60) Provisional application No. 63/316,560, filed on Mar. 4, 2022.

(51) Int. Cl.
*G21C 7/103* (2006.01)
*G21C 5/02* (2006.01)
(Continued)

(52) U.S. Cl.
CPC ............... *G21C 7/103* (2013.01); *G21C 5/02* (2013.01); *G21C 7/10* (2013.01); *G21C 17/112* (2013.01); *G21C 7/34* (2013.01)

(58) Field of Classification Search
CPC .................................. G21C 7/10; G21C 7/103
See application file for complete search history.

(56) References Cited

U.S. PATENT DOCUMENTS 3,103,479 A * 9/1963 Ransohoff ................ G21C 7/10 376/202
7,871,198 B2 * 1/2011 Rempe ................... H10N 10/01 374/208
(Continued)

*Primary Examiner* — Sharon M Davis
(74) *Attorney, Agent, or Firm* — TraskBritt

(57) ABSTRACT

A Control Neutron Absorber (CNA) assembly for a microreactor that produces nuclear energy is disclosed. The CNA assembly includes a housing, a CNA rod, and a burnable absorber. The housing includes an inner housing and an outer housing. The inner housing is configured to receive a CNA rod. The outer housing extends coaxially with the inner housing and is positioned radially outward and offset from the inner housing defining a cavity therebetween. The CNA rod includes a neutron absorbing rod including a first neutron absorbing material. The neutron absorbing rod is positioned within the inner housing and is configured to move axially relative to the inner housing. The burnable absorber includes a second neutron absorbing material, exhibits a neutron absorbing strength that is less than that of the neutron absorbing rod, is positioned within the inner housing, and is configured to receive the neutron absorbing rod therein.

20 Claims, 6 Drawing Sheets

(51) Int. Cl.
*G21C 7/10* (2006.01)
*G21C 17/112* (2006.01)
*G21C 7/34* (2006.01)

(56) References Cited

U.S. PATENT DOCUMENTS

| | | | | |
|---|---|---|---|---|
| 2009/0175403 | A1* | 7/2009 | Suzuki ..................... | G21C 1/02 376/268 |
| 2022/0059247 | A1 | 2/2022 | Crawford | |

* cited by examiner

MICROREACTOR WITH CONTROL NEUTRON ABSORBER ASSEMBLY INCLUDING A CONTROL NEUTRON ABSORBER ROD

CROSS-REFERENCE TO RELATED APPLICATIONS

This application claims the benefit of the filing date of U.S. Provisional Patent Application Ser. No. 63/316,560, filed Mar. 4, 2022, for "METHODS AND PRINCIPLES OF AN INTEGRATED, ADJUSTABLE AND MULTI-FUNCTIONAL NEUTRON ABSORBER ROD AND REACTOR COOLANT PRE-HEATER AND REHEATER SYSTEM," the disclosure of which is hereby incorporated herein in its entirety by this reference.

STATEMENT REGARDING FEDERALLY SPONSORED RESEARCH OR DEVELOPMENT

This invention was made with government support under Contract Number DE-AC07-05-1D14517 awarded by the United States Department of Energy. The government has certain rights in the invention.

TECHNICAL FIELD

This invention relates to reactivity control, reactor coolant heating and re-heating in a compact, integrated, and multi-functional system.

BACKGROUND

Nuclear reactors are generally large in size, and thus, flux control mechanisms (e.g., shutdown rods, control rods, control drums) of the reactors have extensive volumes to occupy. The extensive volumes allow the flux control mechanisms to be relatively long, which allows component accessibility and displacing sensitive parts from a reactor environment (flux and thermal). Furthermore, the large volumes allow supplementary shielding for radiation sensitive components (e.g., electrical components). However, microreactors are much smaller and do not provide the luxury of larger volumes or associated weight allowances for flux control mechanisms.

Microreactors have a relatively large number of intended uses, such as, for example, electric power generation, high-grade heat production, hydrogen production, etc. Microreactors are particularly useful in geographically isolated environments since their smaller size enables relatively easy transportation. Several technologies are being developed to facilitate microreactors, and each of the technologies presents its own system requirements, including the mechanical control system's (e.g., a control rod drive system's), abilities to effectively function in a restricted volume (e.g., space), while also accommodating a wide range of environmental conditions present in the microreactor. Many conventional mechanical control systems are very specific to the nuclear reactor in question and lack flexibility to tune their functions to various desired performance features (e.g., motion response times, force requirements, shielding, etc.) of other systems, such as microreactors.

The above-described background relating to nuclear reactors and microreactors is merely intended to provide a contextual overview of some current issues and is not intended to be exhaustive. Other contextual information may become apparent to those of ordinary skill in the art upon review of the following description, which includes example embodiments.

BRIEF SUMMARY

This invention relates to reactivity control, reactor coolant heating and re-heating in a compact, integrated, and multi-functional system.

In one illustrative embodiment, the present disclosure provides a Control Neutron Absorber (CNA) assembly for a microreactor that produces nuclear energy. The CNA assembly includes a housing, a CNA rod, and a burnable absorber. The housing includes an inner housing and an outer housing. The inner housing is configured to receive a CNA rod. The outer housing extends coaxially with the inner housing and is positioned radially outward and offset from the inner housing defining a cavity therebetween. The CNA rod includes a neutron absorbing rod including a first neutron absorbing material. The neutron absorbing rod is positioned within the inner housing and is configured to move axially relative to the inner housing. The burnable absorber includes a second neutron absorbing material. The burnable absorber exhibits a neutron absorbing strength that is less than that of the neutron absorbing rod. The burnable absorber is positioned within the inner housing and is configured to receive the neutron absorbing rod therein.

In another illustrative embodiment, the present disclosure provides a CNA rod for a microreactor that produces nuclear energy. The CNA rod includes a neutron absorbing rod, a drive shaft, and a heater. The neutron absorbing rod includes a neutron absorbing material formulated to limit or shutdown a nuclear reaction in a reactor core of the microreactor while inserted in the reactor core. The drive shaft extends in an axial direction from the neutron absorbing rod and is configured to couple with an actuator. The heater is mounted to and positioned radially outward from one or more of the drive shaft and the neutron absorbing rod. The heater is configured to move with the drive shaft and the neutron absorbing rod.

In a further illustrative embodiment, the present disclosure provides a microreactor configured to produce nuclear energy. The microreactor includes a reactor core, a top flange, and a CNA assembly. The reactor core includes a fuel region. The top flange defines a top head of an upper core barrel and includes one or more instrumentation penetrations. The CNA assembly includes an inner housing, an outer housing, a CNA rod, and a burnable absorber. The inner housing extends from the top flange and through the fueled region. The inner housing is configured to receive a CNA rod. The outer housing extends from the top flange coaxially with the inner housing and is positioned radially outward and offset from the inner housing. The inner housing, the outer housing, and the top flange define a cavity therebetween. The CNA rod includes a neutron absorbing rod including a first neutron absorbing material. The burnable absorber is configured to receive the neutron absorbing rod therein and includes a second neutron absorbing material. A combined neutron absorption of the neutron absorbing rod and the burnable absorber is sufficient to shut down a nuclear reaction in the reactor core.

BRIEF DESCRIPTION OF THE DRAWINGS

The disclosure is illustrated and described herein with reference to the various drawings, in which like reference numbers are used to denote like system components/method acts, as appropriate, and in which.

DETAILED DESCRIPTION

The following description provides specific details, such as material compositions, shapes, and sizes, in order to provide a thorough description of embodiments of the disclosure. However, a person of ordinary skill in the art would understand that the embodiments of the disclosure may be practiced without employing these specific details. Indeed, the embodiments of the disclosure may be practiced in conjunction with conventional techniques employed in the industry.

Microreactors are very small nuclear systems, where the nuclear fuel and reactor core geometry is very sensitive to reactivity changes. As such every area and volume within the microreactor has to be efficiently used. The system according to embodiments of the disclosure includes a single assembly for a Control Neutron Absorber (CNA) rod. In various embodiments, this assembly includes the CNA rod that is configured to control reactivity and induce shutdown in the reactor core and one or more of the features that follow. A burnable neutron absorber is located with the CNA rod and segregated from fuel elements in the microreactor. The burnable neutron absorber may be adjusted (e.g., replaced) without changing the fuel elements at the beginning of operational life (zero power physics testing). A neutron source that may be used to start the fission reaction within the microreactor quickly and calibrate nuclear instruments before fuel load to measure exact neutron concentration during each subassembly installation in the reactor core. A heating element to maintain the microreactor or nuclear reactor at hot standby that can provide enough heat to mitigate the natural heat loss from the system between operational cycles. An element that provides a viable containment from the primary coolant fluid to a secondary containment or ambient air.

Figure 1:
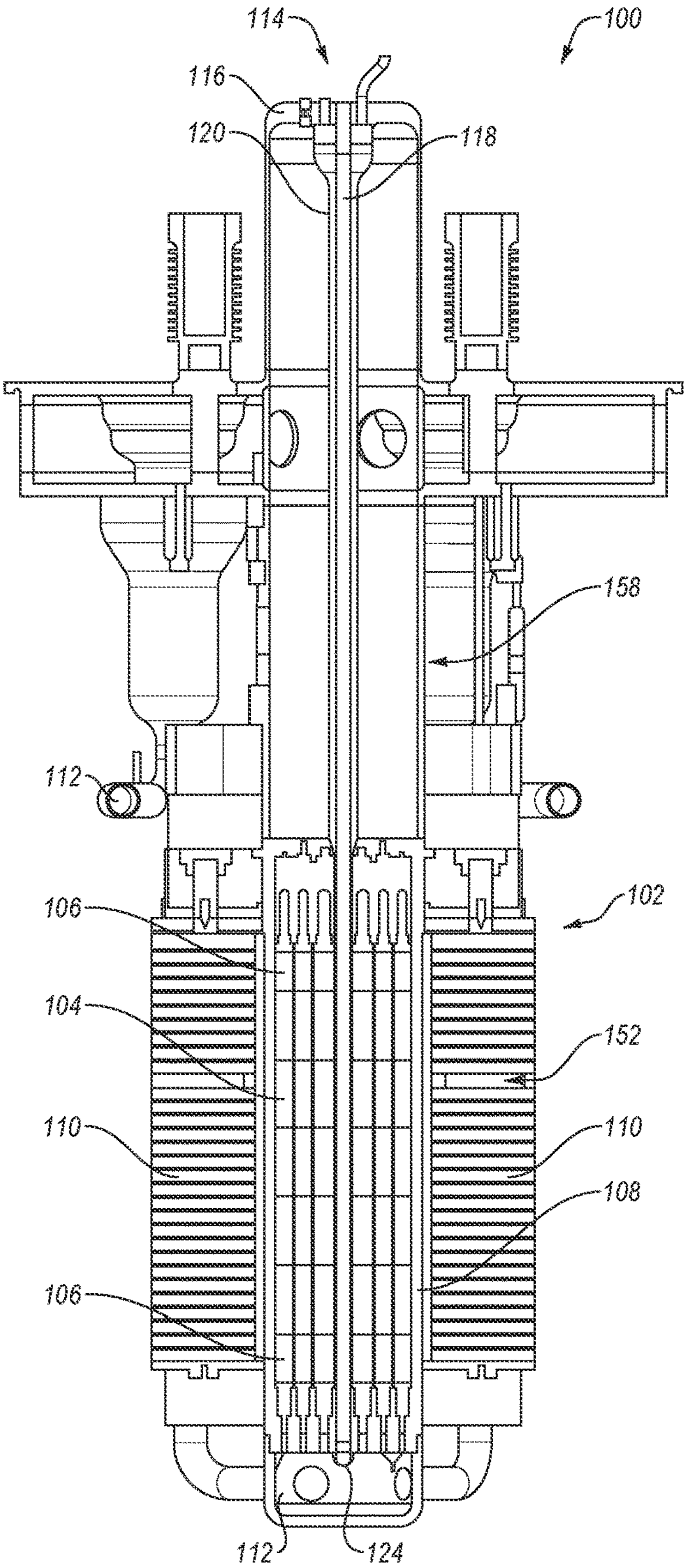
FIG. 1 is a perspective view of embodiments of a microreactor.
Figure 2:
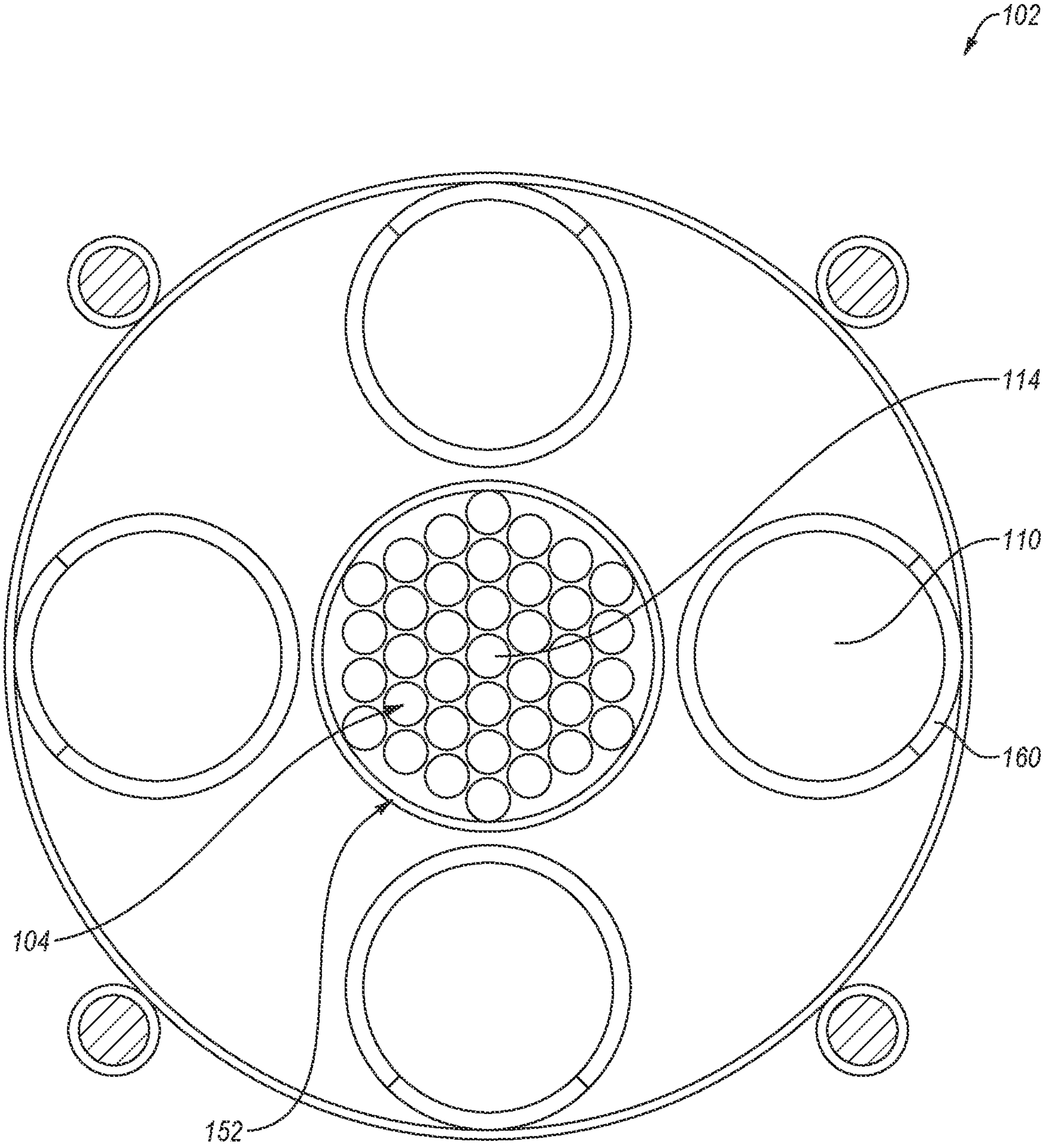
FIG. 2 is a cross-sectional view of embodiments of a reactor core of FIG. 1.

FIG. 1 is a perspective view of embodiments of a microreactor 100. FIG. 2 is a cross-sectional view of embodiments of the reactor core 102 of FIG. 1. Referring to FIGS. 1 and 2, the microreactor 100 includes a reactor core 102, a coolant system 112, and a CNA assembly 114. The reactor core 102 includes a fuel region 152, a nuclear fuel 104, and control drums 110 configured to control the number of neutrons moving within the nuclear fuel 104. The fuel region 152 is positioned radially inward from the control drums 110. The fuel region 152 includes reflectors, such as axial reflectors 106 and a radial reflector 108, enclosing the nuclear fuel 104 therein. The nuclear fuel 104 may include one or more materials that provide a source for the emission of neutrons. Examples include AmBe, Californium-252, Am-241/Be, PuBe, etc. The control drums 110 may be configured to selectively position a neutron absorbing material 160 relative to the nuclear fuel 104 to control the number of neutrons available for fission reactions within the nuclear fuel 104. The nuclear fuel 104 may include multiple fuel rods. The coolant system 112 includes one or more coolant loops, such as natural convection primary and secondary coolant loops. The coolant system 112 is configured to extract heat from the nuclear fuel 104 and convert the heat to energy, such as electrical energy.

Figure 3:
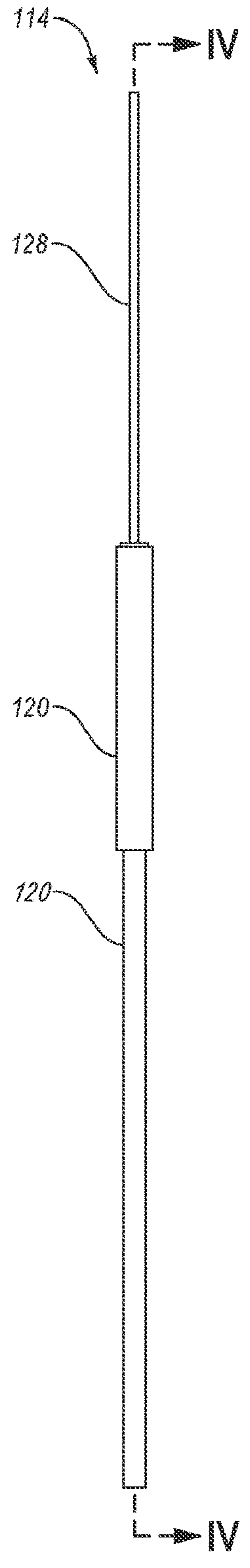
FIG. 3 is a side view of embodiments of a Control Neutron Absorber (CNA) assembly of FIG. 1.
Figure 4:
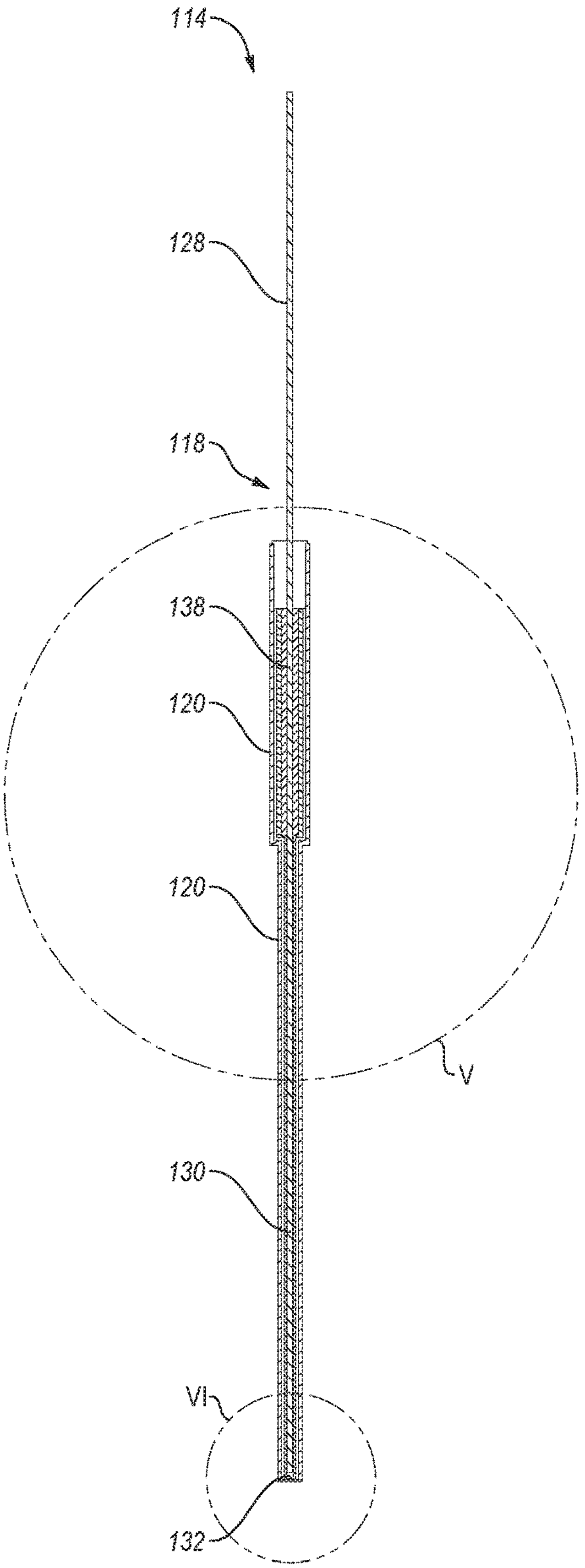
FIG. 4 is a cross-sectional view of the CNA assembly of FIG. 3 taken along the line IV-IV of FIG. 3.

FIG. 3 is a side view of the CNA assembly 114 of FIG. 1. FIG. 4 is a cross-sectional view of the CNA assembly 114 of FIG. 3 taken along the line IV-IV of FIG. 3. Referring to FIGS. 1-4, in various embodiments, the CNA assembly 114 includes a CNA rod 118 and a housing 120 surrounding the CNA rod 118. The CNA rod 118 and the housing 120 may be substantially resistant to high-temperature and radiation conditions within the microreactor 100. The CNA rod 118 includes a drive shaft 128 and a neutron absorbing rod 130. The drive shaft 128 extends axially from the neutron absorbing rod 130 and is configured to connect to an actuator that is configured to move the CNA rod 118 relative to the reactor core 102, such as the control rod drive system disclosed in U.S. patent application Ser. No. 17/399,910, which is herein incorporated by reference. The neutron absorbing rod 130 includes a neutron absorbing material formulated and configured to substantially limit or shutdown a nuclear reaction in the reactor core 102 when inserted therein. The neutron absorbing rod 130 is formed of a material highly absorbing for neutrons, such as boron carbide. The boron carbide may be enriched boron carbide or natural boron carbide. However, other neutron absorbing materials may be used.

The neutron absorbing rod 130 controls reactivity in the reactor core 102 and is configured to shut down the reactor core 102 while positioned within the reactor core 102 through the material thereof that is highly absorbing for neutrons. The neutron absorbing rod 130 is positioned at or adjacent to an end of the CNA rod 118 and the CNA assembly 114. The neutron absorbing rod 130 is configured to move by translation into and out of the reactor core 102, and in particular, the region of the reactor core 102 containing the nuclear fuel 104. The reactivity of the reactor core 102 may be controlled, and shutdown of the microreactor 100 achieved, by introducing (e.g., inserting) and removing the neutron absorbing rod 130 into the region of the reactor core 102 containing the nuclear fuel 104.

FIGS. 1-4 illustrate the CNA assembly 114 inserted in the reactor core 102. The CNA assembly 114 may be located in a center (e.g., a central region) of the microreactor 100 and, in particular, may generally extend from along an axis thereof. In particular, the CNA assembly 114 is arranged with various components thereof (discussed in further detail below) passing through an upper region 158 and the fuel region 152.

The CNA rod 118 may be fully withdrawn from the reactor core 102 during use and operation of the microreactor 100 and may be fully inserted in the reactor core 102 during shutdown conditions. By way of example only, the CNA rod 118 may be inserted (e.g., fully inserted) into the reactor core 102 in a short amount of time, such as within less than or equal to 20 seconds. For instance, the CNA rod 118 may be inserted within less than or equal to about 5 seconds or less than or equal to about 3 seconds.

The housing 120 includes a double-walled tube sufficiently large to house the CNA rod 118. The housing 120 is positioned radially inward from the control drums 110. The housing 120 may define an inner radial boundary of a primary coolant region defined by the fuel region 152 and the upper region 158, the upper region 158 being a cylindrical region positioned axially adjacent to the fuel region 152. The housing 120 extends through the fuel region 152 and the upper region 158 and may be substantially coaxial with both of the fuel region 152 and the upper region 158. In some embodiments, a bottom portion of the housing 120, the burnable absorber 132, and the neutron absorbing rod 130, while inserted into the burnable absorber 132, are positioned in a center of the reactor core 102.

Figure 5:
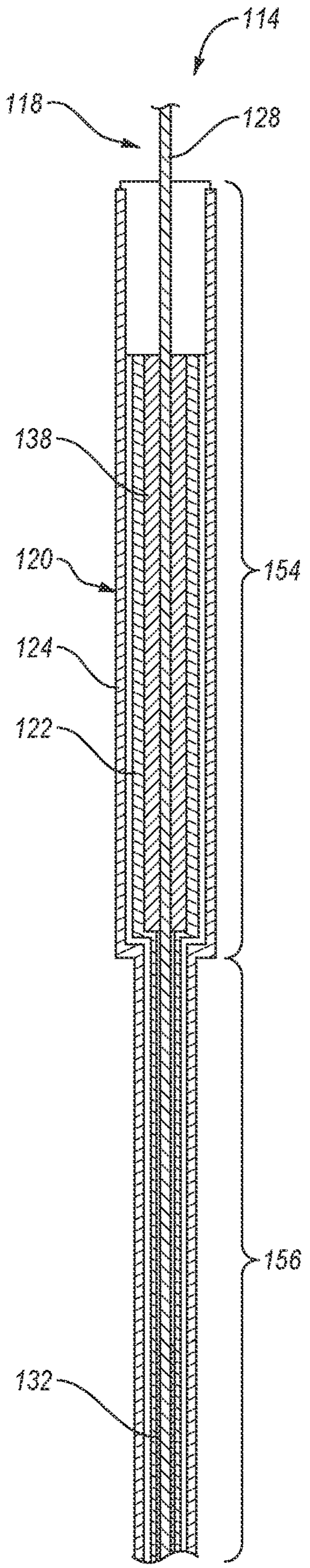
FIG. 5 is a detailed cross-sectional view of a portion of the CNA assembly of FIG. 3 and FIG. 4 identified in circle V of FIG. 4.
Figure 6:
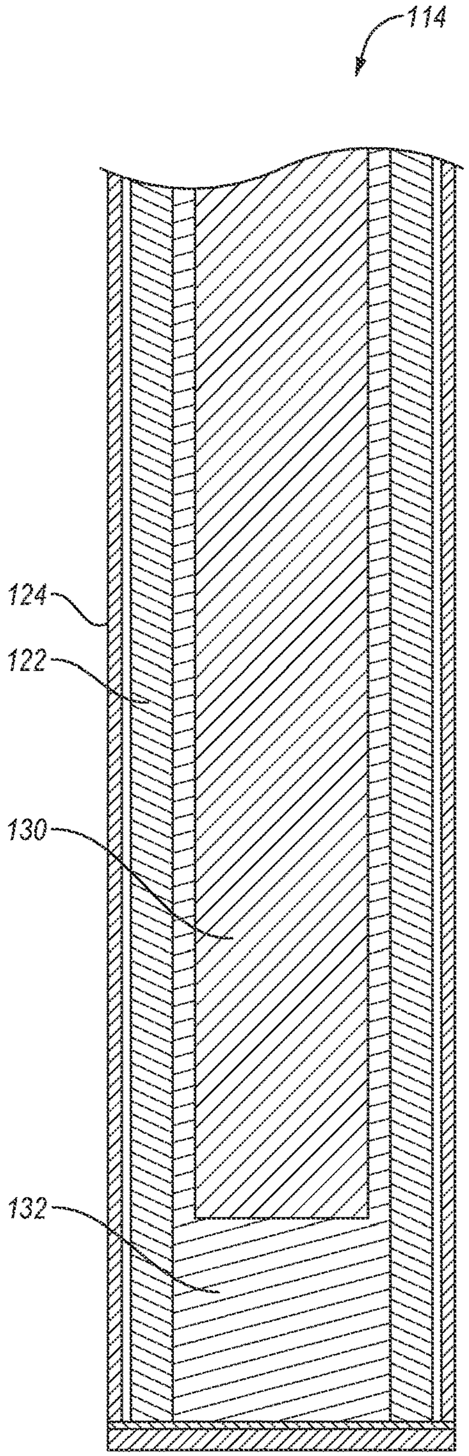
FIG. 6 is a detailed cross-sectional view of a bottom portion of the CNA assembly of FIG. 3 and FIG. 4 identified in circle VI of FIG. 4.

FIG. 5 is a detailed cross-sectional view of a portion of the CNA assembly 114 of FIG. 3 and FIG. 4 identified in circle V of FIG. 4. FIG. 6 is a detailed cross-sectional view of a bottom portion of the CNA assembly 114 of FIG. 3 and FIG. 4 identified in circle VI of FIG. 4. Referring to FIGS. 4-6, the housing 120 includes an outer housing 124 and an inner housing 122 separated from the outer housing 124. The outer housing 124 extends substantially coaxial with the inner housing 122 and is positioned radially outward and offset from the inner housing 122 defining a cavity 126 therebetween. In various embodiments, the outer housing 124 includes the same base material as the structure of a portion of the coolant system 112, such as a primary coolant boundary, to ensure welding therebetween at a base of the outer housing 124 (refer to the bottom of FIG. 1).

The inner housing 122 extends in an axial direction of the microreactor 100 and through the fuel region 152 of the reactor core 102 of the microreactor 100. The inner housing 122 is configured to receive the CNA rod 118, and in particular, the neutron absorbing rod 130 therein. The drive shaft 128 may extend beyond the inner housing 122 and protrude from the housing 120 for connection to an actuator/actuation system (not shown). The inner housing 122 may be formed of a metal with a low neutron absorption cross-section. The inner housing 122 may be formed of materials such as zircaloy or stainless steel. The inner housing 122 may be attached to components of the microreactor 100 by a weld, braze, thread, non-metal gasket, metal gasket, or metal-to-metal seal, such as Swagelok fittings. The outer housing 124 and the inner housing 122 may be formed of the same material, such as a stainless steel.

The double wall configuration of the housing 120, with the outer housing 124 and the inner housing 122 with the cavity 126 defined therebetween, is configured for safety and leak detection. The housing 120 is also configured to house the CNA rod 118. The housing 120 extends through part of the coolant system 112 and extends into the fuel region 152 of the reactor core 102. The housing 120 is part of a coolant boundary, such as a primary coolant boundary, defined by the fuel region 152, the upper region 158, a top flange 116 (discussed in further detail below), and the housing 120 (refer to FIG. 1). The housing 120 provides containment for the coolant to prevent the coolant from directly contacting the CNA rod 118. In various embodiments, the housing 120 is configured to remain stationary relative to the reactor core 102 and the CNA rod 118 is configured to move axially inside of the housing 120. The stationary configuration, e.g., with the housing 120 held in place by welds, may improve the likelihood of containing the coolant without some of the problems attending configurations that facilitate movement of the housing 120 relative to the reactor core 102, e.g., with housing 120 held in place and guided by seals. Since seals are prone to wear, the seals may contribute to risk of coolant leakage and fouling. The fouling may further contribute to risk of impediment of motion.

In various embodiments, the CNA rod 118 further includes a heater 138. The heater 138 is removably coupled to and positioned radially outward from one or more of the drive shaft 128 or the neutron absorbing rod 130. In FIG. 4 and FIG. 5, the heater 138 is mounted to and positioned radially outward from the drive shaft 128 so as to not interfere with the functions of the neutron absorbing rod 130 and the burnable absorber 132. The heater 138 remains within the housing 120 during normal operating and shutdown conditions. The heater 138 may be removably coupled to the one or more of the drive shaft 128 or the neutron absorbing rod 130 via an interference fit, clamps, fasteners, pins, or by other methods known in the art. The heater 138 is configured to move axially with the other components of the CNA rod 118.

The heater 138 is positioned relative to the other components of the CNA rod 118 so as to be in the vertical section of the housing 120 that is in thermal communication with the primary coolant of the microreactor 100 while the neutron absorbing rod 130 is positioned within the reactor core 102 and the nuclear fuel 104. In various embodiments, the heater 138 is configured to move into and out of the reactor core 102 with the neutron absorbing rod 130.

The heater 138 may be an electric heater and may exhibit a hollow cylindrical shape. The heater 138 may have mineral insulated cables or other high temperature wiring configured to withstand the high-temperature operation and the radiation field of the microreactor 100. The heater 138 is configured to be replaceable. Thus, in various embodiments, the heater 138 is removably coupled to one or more other components of the CNA rod 118, such as to the drive shaft 128, which facilitates replacement of the heater 138 while the microreactor 100 is shut down. The location of the heater 138 on the CNA rod 118 facilitates access to the heater 138 while the CNA rod 118 is not inserted within the reactor core 102 providing for the heater 138 to be repaired in situ or replaced. In various embodiments, the CNA rod 118 is configured to be removed from the reactor core 102 while the microreactor 100 is shut down and the control drums 110 are inactive and control the reactivity of the microreactor 100.

The heater 138 may have embedded thermocouples to measure temperature at various axial lengths. In various embodiments, the heater 138 includes an outer diameter that is smaller than an inner diameter of the inner housing 122, such as at an upper portion 154 of the housing 120, to minimize drag during relative movement between the CNA rod 118 and the housing 120. The minimal drag may facilitate movement of the CNA rod 118 relative to the housing 120 and movement of various components of the CNA rod 118 into the reactor core 102. The outer diameter of the heater 138 may be sufficiently small relative to an inner diameter of the inner housing 122 to define a radial gap with the inner housing 122 for air or gas to pass through, which may further reduce drag during movement of the CNA rod 118.

The heater 138 provides a source of heat that is used to maintain reactor coolant system temperature at a desired temperature during a temporary shutdown to facilitate a quick restart of the nuclear reaction. In particular, the heater 138 provides heat input to the system to overcome the heat losses of the coolant system while the microreactor 100 is temporarily shut down. In various embodiments, the heater 138 is configured to maintain a minimum temperature of the coolant. For example, the coolant may be a liquid metal and the heater 138 is configured to keep the metal above the melting temperature and in the liquid state, or to provide heat to a primary coolant that can then transfer the heat to a liquid metal secondary coolant to maintain the secondary coolant above the melting temperature and in the liquid state.

In various embodiments, the CNA assembly 114 further includes a burnable absorber 132. The burnable absorber 132 is positioned within the inner housing 122 and at least partially within the fuel region 152 of the reactor core 102, but is not affixed to the housing 120 and is separate from the nuclear fuel 104. The burnable absorber 132 is configured to be positioned within the inner housing 122 and remain stationary within the inner housing 122. The burnable absorber 132 remains within the portion of the housing 120 that extends through the reactor core 102 while the CNA rod 118 is moved into and out of the reactor core 102. The burnable absorber 132 is configured to receive a portion of the CNA rod 118 therein, and in particular, the neutron absorbing rod 130. The neutron absorbing rod 130 is configured to be inserted into and removed out of the burnable absorber 132 during shutdown and operation of the microreactor 100. The outer diameter of the neutron absorbing rod 130 may be smaller than an inner diameter of the burnable absorber 132 to facilitate the insertion and removal of the neutron absorbing rod 130. The configuration of the neutron absorbing rod 130 and the burnable absorber 132 may be such that any friction between opposing surfaces thereof may be overcome by the gravitational force applied to the CNA rod 118.

In various embodiments, the burnable absorber 132 includes a hollow cylindrical shape defining an inner cylinder sufficiently large to receive the neutron absorbing rod 130 therein. The burnable absorber 132 includes a neutron absorbing material with a neutron absorbing strength that is less than that of the neutron absorbing rod 130, through the use of a lower neutron absorptive material or a smaller quantity of an equal or higher neutron absorptive material. The burnable absorber 132 may include erbium and/or gadolinium or other neutron absorber (based on the energy spectrum of the reactor) embedded in pure metal, ceramic or alloy form. An example of an alloy is neutron absorbers (erbium or gadolinium) embedded in zirconium or beryllium metal. The material of the burnable absorber 132 is selected based on the energy spectrum of the microreactor 100.

In the embodiments of FIGS. 5 and 6, the axis of the burnable absorber 132 and the neutron absorbing rod 130 are aligned where the burnable absorber 132 and the neutron absorbing rod 130 are substantially coaxial while the neutron absorbing rod 130 is inserted into the burnable absorber 132. Thus, the burnable absorber 132 is positioned radially outward of and circumferentially surrounding the neutron absorbing rod 130 while the neutron absorbing rod 130 is inserted into the burnable absorber 132. In these embodiments, the burnable absorber 132 is substantially coaxial with the lower portion 156 of the housing 120 (outer housing 124 and inner housing 122), and the CNA rod 118 is substantially coaxial with the upper portion 154 of the housing 120 (outer housing 124 and inner housing 122).

The neutron absorbing strength of the burnable absorber 132 may vary over time throughout the reactor cycle. The burnable absorber 132 is configured to be removed and replaced once the neutron absorbing material has lost its strength and has been "burned." The burnable absorber 132 may be configured to be removed and replaced manually. In various embodiments, the burnable absorber 132 includes a top end stop/lock to prevent movement thereof during insertion and removal of the neutron absorbing rod 130.

In various embodiments, the CNA assembly 114 is configured with sufficient neutron absorption properties to shut down and maintain the microreactor 100 in a subcritical condition with up to 3 failed control drums 110. In some embodiments, the CNA rod 118 is configured to shut down the microreactor 100 even while some or all of the control drums 110 are rotated in a position for a maximum nuclear energy output.

Figure 7:
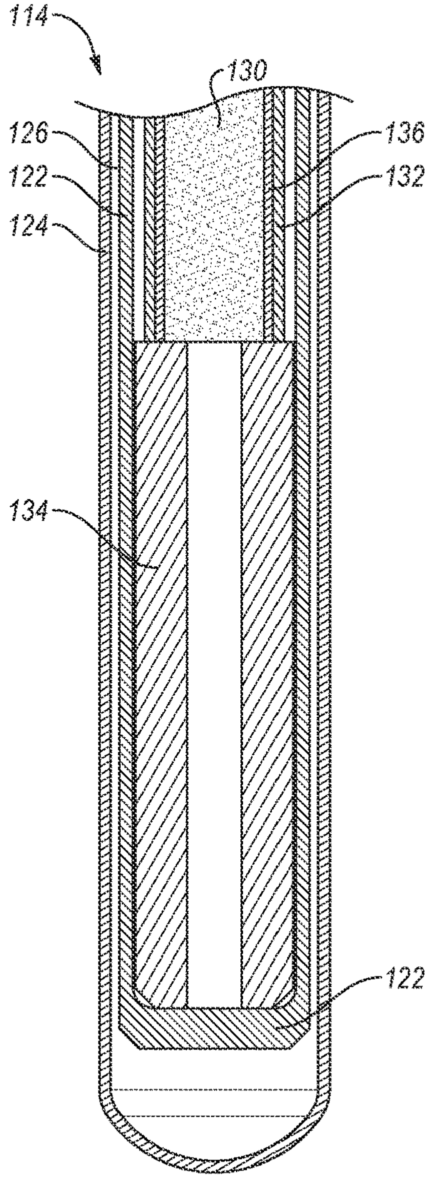
FIG. 7 is a detailed cross-sectional view of alternate embodiments of the bottom portion of the CNA assembly of FIG. 6.

FIG. 7 is a detailed cross-sectional view of alternate embodiments of the bottom portion of the CNA Assembly of FIG. 6. In FIG. 7, the CNA assembly 114 includes a spacer 134. The spacer 134 is positioned at a bottom of the housing 120 and is configured to remain within the inner housing 122 and vertically position the burnable absorber 132 relative to the reactor core 102. In particular, vertically position an end of the burnable absorber 132 and the neutron absorbing rod 130, while inserted in the burnable absorber 132 for the positioning thereof. In other embodiments, such as the embodiments of FIG. 6, the spacer 134 is integrated into a bottom of the burnable absorber 132.

Figure 8:
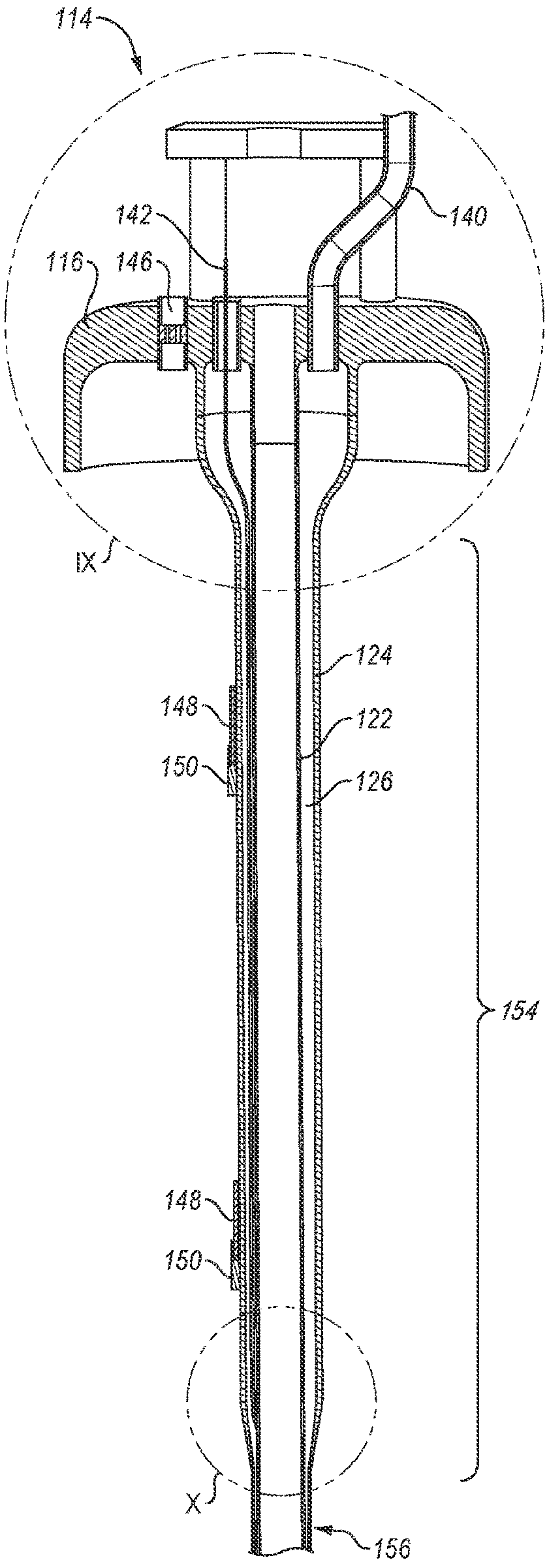
FIG. 8 is a cross-sectional view of an upper portion of embodiments of CNA assembly of FIG. 7.

FIG. 8 is a cross-sectional view of an upper portion of embodiments of CNA assembly 114 of FIG. 1. Referring to FIG. 8, in various embodiments, the CNA assembly 114 includes one or more thermocouples 148 configured for measuring a temperature of the coolant. In some of these embodiments, multiple thermocouples 148 are positioned along an outer surface of the outer housing 124 and offset from one another in the axial direction relative to the axis of the microreactor 100. By positioning multiple thermocouples 148 from one another in the axial direction, a fluid level of the coolant within the microreactor 100 may be determined using the temperatures measured by each of the multiple thermocouples 148. While FIG. 8 shows two thermocouples 148 axially offset, any number of thermocouples 148 may be used. The thermocouples 148 may be connected to an outer surface of the outer housing 124. In the embodiments illustrated in FIG. 8, each of the thermocouples 148 are welded to the outer housing 124 via a weld pad 150. The weld pad 150 may be tungsten inert gas (tig) welded to the outer surface of the outer housing 124.

In various embodiments, at least one thermocouple 148 is positioned at or adjacent to an outlet of the coolant from the reactor core 102. A temperature of the coolant may be detected by the at least one thermocouple 148 and the temperature of at least two thermocouples 148 may be used to determine a flow-rate of the coolant via a correlation made between the temperature of the coolant and a flowrate of the coolant. In particular, a correlation may be made between the temperature(s) measured at each of the at least one thermocouple 148 and a flowrate of the coolant. For example, a timing of temperature change between the thermocouples 148 may indicate the coolant flow rate while other conditions of the microreactor 100 remain constant.

As illustrated in the embodiments of FIG. 8, the outer housing 124 may include an upper portion 154 positioned in an upper region 158 of the microreactor 100 (refer to FIG. 1) axially above and outside of the fuel region 152 (refer to FIG. 1) and a lower portion 156 positioned within the fuel region 152 (refer to FIG. 1). A material thickness of the upper portion 154 of the outer housing 124 may be thicker than the lower portion 156 of the outer housing 124, which may provide mechanical strength and rigidity (e.g., straightness) to the outer housing 124. The length of lower portion 156 of the outer housing 124, proximal to the nuclear fuel 104, may include a reduced material thickness to minimize neutron absorption. The strength and rigidity of the housing 120 may enable the CNA rod 118 to be inserted and removed from the reactor core 102 without damaging the CNA rod 118.

Figure 9:
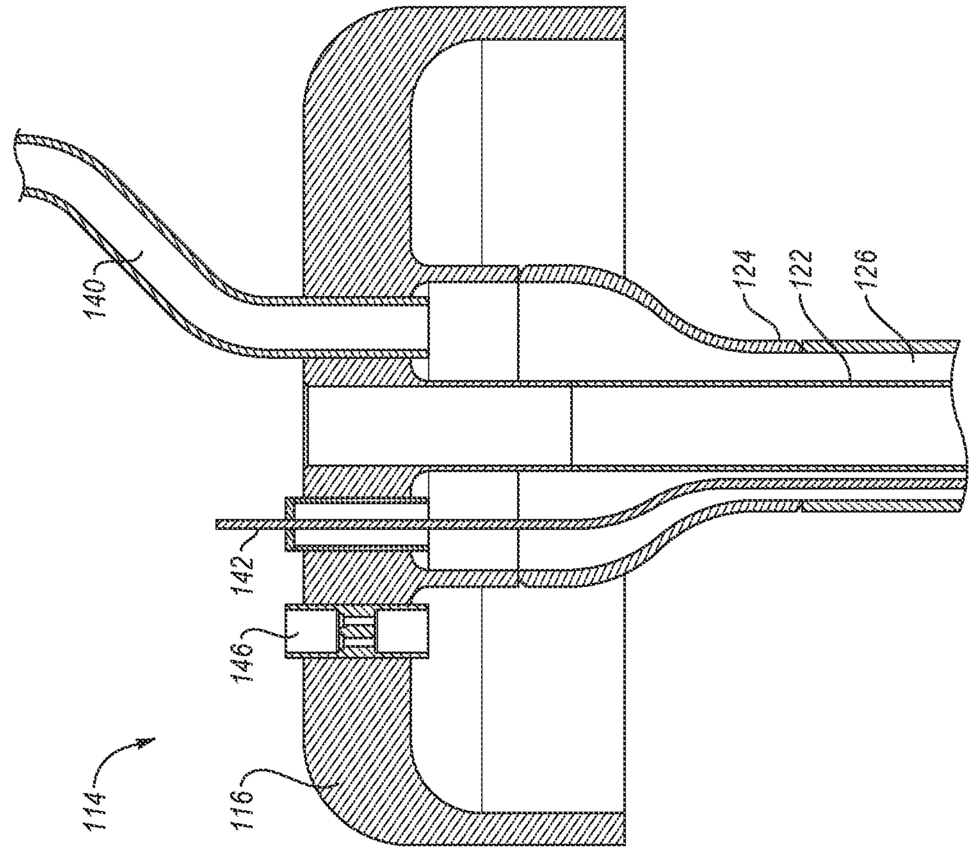
FIG. 9 is a detailed cross-sectional view of a portion of the CNA assembly of FIG. 1 and FIG. 8 identified in circle IX of FIG. 8.

FIG. 9 is a detailed cross-sectional view of a portion of the CNA Assembly of FIG. 1 and FIG. 8 identified in circle IX of FIG. 8. Referring to FIGS. 8 and 9, in various embodiments, the CNA assembly 114 includes a top flange 116 that defines a top head of an upper core barrel of the microreactor 100. The top flange 116 is joined to the outer housing 124 and the inner housing 122 via one or more of welding, sealing/fittings (such as via Swagelok fittings), and the like. The top flange 116 includes one or more instrumentation penetrations. An outer rim of the top flange 116 and the outer housing 124 form a Primary Coolant System ("PCS") pressure boundary. The center of the top flange 116 and the inner housing 122 form a secondary confinement boundary.

In some embodiments, the CNA assembly 114 includes a braze plug 146 inserted into an instrumentation penetration that extends through the top flange 116 outside of the cavity 126. The braze plug 146 is brazed to the one or more thermocouples 148, which enables the data from the one or more thermocouples 148 to be obtained for determining the temperature of the coolant and for determining a fluid level of the coolant. In various embodiments, the upper portion of the outer housing 124, outside of the reactor core 102, includes a larger diameter and the thermocouples 148 are positioned along this portion of the outer housing 124 that includes the larger diameter.

In some embodiments, the CNA assembly 114 includes a pressure tap 140 fluidly coupled to the cavity 126 via an instrumentation penetration that extends through the top flange 116 and provides access to the cavity 126. The pressure tap 140 is configured to establish an inert atmosphere within the cavity 126 and to measure pressure within the cavity 126. In some embodiments, the inert gas is supplied such that the operating pressure of the inert gas within cavity 126 is higher than the pressure of the coolant. In the unwanted event of a leak path forming between cavity 126 and the primary coolant system, this higher relative pressure provides protection against leakage of the coolant from the primary coolant system into the cavity 126, thus assisting with reducing the possibility of ultimately releasing coolant and its associated radiological and chemical hazards to the environment. In these embodiments, the relative pressure difference may be for example as much as 15 kPa (sufficient to overcome expected hydrostatic head) or for example by as much as 70 kPa (sufficient to overcome the sum of hydrostatic head plus the surface tension of the primary coolant at the gas-liquid interface where the leak forms). The latter relative pressure difference may, in the event of a leak occurring, produce a measurable pressure drop within cavity 126, which may be an indication that a leak has occurred. In some embodiments, the inert gas is supplied to such a pressure that the thermal conductivity of the inert gas is significantly increased, improving the thermal conduction path between the heater 138 and the coolant. In these embodiments, the pressure may be as high as 5 MPa with for example helium as the inert gas.

Figure 10:
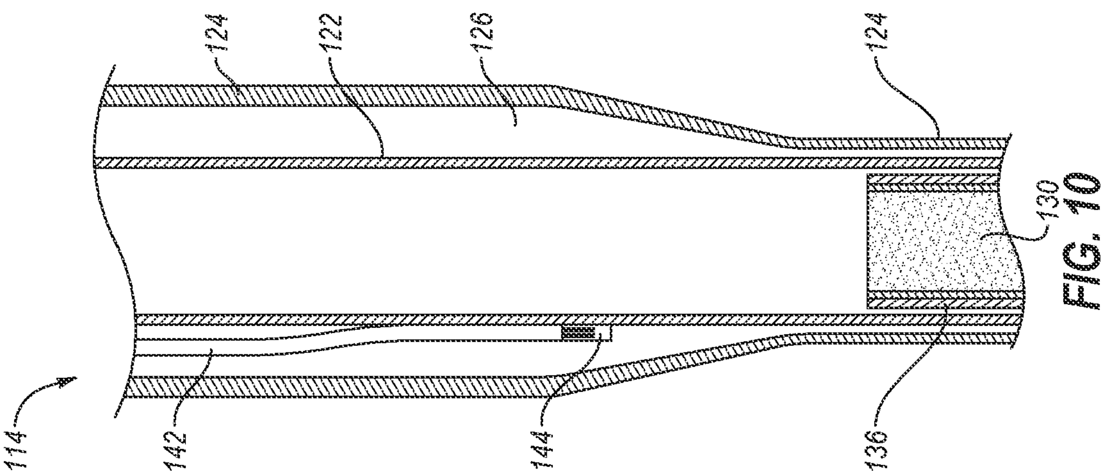
FIG. 10 is a detailed cross-sectional view of a portion of the CNA assembly of FIG. 1 and FIG. 8 identified in circle X of FIG. 8.

FIG. 10 is a detailed cross-sectional view of a portion of the CNA Assembly of FIG. 1 and FIG. 8 identified in circle X of FIG. 8. Referring to FIGS. 8-10, in various embodiments, the CNA assembly 114 includes a leak detector 142 configured to detect a leak in the housing 120, and in particular, the outer housing 124. The leak detector 142 extends through the top flange 116 via an instrumentation penetration and into the cavity 126. In some of these embodiments, the leak detector 142 extends into the cavity 126 as far as possible. In FIG. 9, the upper portion of the cavity 126, outside of the reactor core 102 includes a radial width (i.e., the radial distance between the outer housing 124 and the inner housing 122) that is larger than a radial width of the cavity 126 within the reactor core 102 and the leak detector 142 extends to a transition point where the radial width of the cavity 126 changes from the larger radial width to the smaller radial width. The leak detector 142 may include one or more sensors 144 at an end thereof configured for detecting leaks within the cavity 126. In some embodiments, the one or more sensors 144 include a leak detection sensor to sense leaks. In various embodiments, the pressure tap 140 is configured for back up leak detection and includes a pressure transducer to sense the leak and presence of a fluid, such as argon.

Referring to FIGS. 1 and 10, in various embodiments, the CNA rod 118 includes cladding 136 on an outer surface of the neutron absorbing rod 130. In some embodiments, the cladding 136 is also positioned on an outer surface of the drive shaft 128. The cladding 136 includes threading and/or pinning for connecting the neutron absorbing rod 130 or the CNA rod 118 with other components, such as an actuator for controlling the position of the CNA rod 118 relative to the reactor core 102, or for connecting the neutron absorbing rod 130 to the drive shaft 128. The cladding 136 may prevent debris from the neutron absorbing rod 130 from separating from the CNA rod 118 and spreading within the inner housing 122. In particular, over time, as the neutron absorbing rod 130 is used to absorb neutrons from the fuel region 152, portions of an outer surface of the neutron absorbing rod 130 may flake off and be contained by the cladding 136.

In various embodiments, the CNA rod 118 includes a neutron emitting material attached to the rod material that is highly absorbing for neutrons. The neutron emitting material is located in or near the fuel region 152 of the reactor core 102 during fuel loading and zero power physics tests to provide a source of neutrons that will be multiplied by the nuclear fuel and detected by the neutron detectors. The neutron emitting material may also be in or near the fuel region 152 of the reactor core 102 during reactor start-up to start the fission chain reaction. The neutron emitting material is movable as part of the integrated rod and may be moved into and out of the reactor core.

Embodiments of the disclosure may integrate some or all of these features into a single CNA assembly 114, with a CNA rod 118, a burnable absorber 132 into which the CNA rod 118 can be inserted, and a housing 120 that houses the system.

While the figures illustrate a single CNA assembly 114, in various embodiments, the microreactor 100 includes multiple CNA assemblies 114. In these various embodiments, the CNA assemblies 114 are substantially symmetrically arranged about the axis of the microreactor 100 with the lower portion thereof passing through the fuel region 152, such that the neutron absorbing rod 130 of each CNA assembly 114 is insertable into the fuel region 152 to absorb neutrons and reduce/stop the fission chain reaction within the fuel region 152.

As described above, the microreactor 100 disclosed herein incorporates multiple components/functions for the control and operation of a nuclear reactor, such as the microreactor 100, over a fuel cycle and its lifetime. The CNA assembly 114 according to embodiments of the disclosure efficiently combines the components into a system that utilizes minimal space inside the reactor core 102 while maintaining all necessary functions.

A microreactor 100 is designed to be small, which means the space within the microreactor 100 must be used efficiently. The microreactor 100 includes the CNA assembly 114 that enables reactivity control in the limited space of the microreactor 100. The CNA assembly 114 also includes one or more of the arrangements that follow. Neutronic control of the reactor with thermal management of the system during shutdown, such as by combining the heater 138 with the neutron absorbing rod 130. In particular, incorporating a neutron source (e.g., the neutron absorbing rod 130) into a combined heater and neutron control rod. Positioning the burnable absorber 132 within the fuel region 152 of the reactor core 102 throughout the cycle of the microreactor 100, while allowing the neutron absorbing rod 130, which is highly absorbing, to be inserted inside of it for reactivity control and shutdown. Using the CNA assembly 114 according to embodiments of the disclosure in the microreactor 100 enables the desired reactivity control, shutdown capability, and thermal management to be achieved without sacrificing safety or performance of the microreactor 100. The CNA assembly 114 according to embodiments of the disclosure may also reduce initial, non-fuel costs of the microreactor 100 by from about 5% to about 10%.

The detailed description provides specific details, such as material compositions, shapes, and sizes, in order to provide a thorough description of embodiments of the disclosure. However, a person of ordinary skill in the art would understand that the embodiments of the disclosure may be practiced without employing these specific details. Indeed, the embodiments of the disclosure may be practiced in conjunction with conventional techniques employed in the industry.

Drawings presented herein are for illustrative purposes only, and are not meant to be actual views of any particular material, component, structure, device, or system. Variations from the shapes depicted in the drawings as a result, for example, of manufacturing techniques and/or tolerances, are to be expected. Thus, embodiments described herein are not to be construed as being limited to the particular shapes or regions as illustrated, but include deviations in shapes that result, for example, from manufacturing. For example, a region illustrated or described as box-shaped may have rough and/or nonlinear features, and a region illustrated or described as round may include some rough and/or linear features. Moreover, sharp angles that are illustrated may be rounded, and vice versa. Thus, the regions illustrated in the figures are schematic in nature, and their shapes are not intended to illustrate the precise shape of a region and do not limit the scope of the present claims. The drawings are not necessarily to scale. Additionally, elements common between figures may retain the same numerical designation.

As used herein, the terms "configured" and "configuration" refer to a size, a shape, a material composition, a material distribution, orientation, and arrangement of at least one feature (e.g., one or more of at least one structure, at least one material, at least one region, at least one device) facilitating use of the at least one feature in a pre-determined way.

As used herein, the term "substantially" in reference to a given parameter means and includes to a degree that one skilled in the art would understand that the given parameter, property, or condition is met with a small degree of variance, such as within acceptable manufacturing tolerances. By way of example, depending on the particular parameter, property, or condition that is substantially met, the parameter, property, or condition may be at least 90.0 percent met, at least 95.0 percent met, at least 99.0 percent met, at least 99.9 percent met, or even 100.0 percent met.

As used herein, "about" or "approximately" in reference to a numerical value for a particular parameter is inclusive of the numerical value and a degree of variance from the numerical value that one of ordinary skill in the art would understand is within acceptable tolerances for the particular parameter. For example, "about" or "approximately" in reference to a numerical value may include additional numerical values within a range of from 90.0 percent to 122.0 percent of the numerical value, such as within a range of from 95.0 percent to 105.0 percent of the numerical value, within a range of from 97.5 percent to 114.5 percent of the numerical value, within a range of from 99.0 percent to 101.0 percent of the numerical value, within a range of from 99.5 percent to 100.5 percent of the numerical value, or within a range of from 99.9 percent to 100.1 percent of the numerical value.

As used herein, relational terms, such as "beneath," "below," "lower," "bottom," "above," "upper," "top," "front," "rear," "left," "right," and the like, may be used for ease of description to describe one element's or feature's relationship to another element(s) or feature(s) as illustrated in the drawings. Unless otherwise specified, the spatially relative terms are intended to encompass different orientations of the materials in addition to the orientation depicted in the figures. For example, if materials in the figures are inverted, elements described as "below" or "beneath" or "under" or "on bottom of" other elements or features would then be oriented "above" or "on top of" the other elements or features. Thus, the term "below" can encompass both an orientation of above and below, depending on the context in which the term is used, which will be evident to one of ordinary skill in the art. The materials may be otherwise oriented (e.g., rotated 90 degrees, inverted, or flipped) and the spatially relative descriptors used herein interpreted accordingly.

As used herein, the singular forms "a," "an," and "the" are intended to include the plural forms as well, unless the context clearly indicates otherwise.

As used herein, the term "and/or" means and includes any and all combinations of one or more of the associated listed items.

As used herein, the terms "vertical," "longitudinal," "horizontal," and "lateral" are in reference to a major plane of a structure and are not necessarily defined by earth's gravitational field. A "horizontal" or "lateral" direction is a direction that is substantially parallel to the major plane of the structure, while a "vertical" or "longitudinal" direction is a direction that is substantially perpendicular to the major plane of the structure. The major plane of the structure is defined by a surface of the structure having a relatively large area compared to other surfaces of the structure.

Although the present disclosure has been illustrated and described herein with reference to various embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A Control Neutron Absorber (CNA) assembly for a microreactor that produces nuclear energy, the CNA assembly comprising:

a housing including:

an inner housing configured to receive a CNA rod; and an outer housing extending coaxially with the inner housing and positioned radially outward and offset from the inner housing defining a cavity therebetween;

the CNA rod including a neutron absorbing rod including a first neutron absorbing material, the neutron absorbing rod being positioned within the inner housing and configured to move axially relative to the inner housing; and a burnable absorber including a second neutron absorbing material, the burnable absorber exhibiting a neutron absorbing strength that is less than that of the neutron absorbing rod, the burnable absorber positioned within the inner housing and configured to receive the neutron absorbing rod therein.

2. The CNA assembly of claim 1, wherein the cavity comprises an inert atmosphere therein.

3. The CNA assembly of claim 1, wherein the burnable absorber includes a hollow cylindrical shape defining an inner cylinder configured to receive the neutron absorbing rod therein.

4. The CNA assembly of claim 1, wherein the CNA rod further includes:

a drive shaft extending in an axial direction from the neutron absorbing rod and configured to couple with an actuator; and a heater configured to move with the drive shaft and the neutron absorbing rod.

5. The CNA assembly of claim 4, wherein the heater comprises an electric heater and includes a hollow cylinder shape that surrounds a portion of the drive shaft.

6. The CNA assembly of claim 4, wherein the heater is removably coupled to one or more other components of the CNA rod.

7. The CNA assembly of claim 1, further comprising one or more thermocouples attached to one or more components of the CNA assembly and configured for measuring a temperature of a coolant.

8. The CNA assembly of claim 7, wherein the one or more thermocouples comprises multiple thermocouples positioned along an outer surface of the outer housing and offset from one another in an axial direction of the outer housing.

9. The CNA assembly of claim 1, wherein the CNA rod further comprises:

a drive shaft extending in an axial direction from the neutron absorbing rod and configured to couple with an actuator; and a heater mounted to and positioned radially outward from one or more of the drive shaft and the neutron absorbing rod, the heater configured to move with the drive shaft and the neutron absorbing rod.

10. The CNA assembly of claim 9, wherein the CNA rod further comprises a cladding on an outer surface of the neutron absorbing rod.

11. The CNA assembly of claim 10, wherein the cladding is on an outer surface of the drive shaft and includes threading for coupling the drive shaft to the actuator.

12. The CNA assembly of claim 9, wherein the heater is removably coupled to one or more other components of the CNA rod.

13. The CNA assembly of claim 9, wherein the heater is an electric heater and includes a hollow cylinder shape that extends around a portion of the drive shaft.

14. A microreactor configured to produce nuclear energy, comprising:

a reactor core including a fuel region;

a top flange that defines a top head of an upper core barrel and includes one or more instrumentation penetrations; and a Control Neutron Absorber (CNA) assembly including:

an inner housing extending from the top flange and through the fuel region, the inner housing configured to receive a CNA rod;

an outer housing extending from the top flange coaxially with the inner housing and positioned radially outward and offset from the inner housing, the inner housing, the outer housing, and the top flange defining a cavity therebetween;

the CNA rod including a neutron absorbing rod including a first neutron absorbing material, the neutron absorbing rod being positioned within the inner housing and configured to move axially relative to the inner housing; and a burnable absorber including a second neutron absorbing material, the burnable absorber exhibiting a neutron absorbing strength that is less than that of the neutron absorbing rod, the burnable absorber positioned within the inner housing and configured to receive the neutron absorbing rod therein, and a combined neutron absorption of the neutron absorbing rod and the burnable absorber is sufficient to shut down a nuclear reaction in the reactor core.

15. The microreactor of claim 14, wherein the burnable absorber is configured to remain stationary within the inner housing while the CNA rod is moved in and out of the reactor core.

16. The microreactor of claim 14, wherein the CNA assembly further includes multiple thermocouples positioned along an outer surface of the outer housing and offset from one another in an axial direction of the microreactor for determining a temperature of a coolant of the microreactor and to determine a fluid level of the coolant.

17. The microreactor of claim 14, wherein the CNA assembly further includes a leak detector that extends through one of the one or more instrumentation penetrations and into the cavity, the leak detector configured to detect a leak in one or more of the inner housing and the outer housing.

18. The microreactor of claim 14, wherein the CNA assembly further includes a pressure tap fluidly coupled to the cavity via one of the one or more instrumentation penetrations that extends through the top flange and provides access to the cavity, the pressure tap configured to establish an inert atmosphere with a pressure that is higher than a pressure of a primary coolant and sense the pressure within the cavity.

19. The microreactor of claim 14, wherein the CNA rod further includes:

a drive shaft extending in an axial direction from the neutron absorbing rod and configured to couple with an actuator; and a heater configured to move with the drive shaft and the neutron absorbing rod so as to be in thermal communication with a vertical section of the outer housing that is in thermal communication with a primary coolant of the microreactor while the neutron absorbing rod is positioned within the reactor core.

20. The microreactor of claim 14, wherein a bottom portion of the housing, the burnable absorber, and the neutron absorbing rod, while inserted into the burnable absorber, are positioned in a center of the reactor core.

* * * * *